United States Patent [19]

Kuwahara

[11] Patent Number: 4,899,160
[45] Date of Patent: Feb. 6, 1990

[54] GUIDANCE EQUIPMENT FOR MICROWAVE LANDING SYSTEM

[75] Inventor: Yoshihiko Kuwahara, Tokyo, Japan

[73] Assignee: NEC Corporation, Tokyo, Japan

[21] Appl. No.: 246,683

[22] Filed: Sep. 20, 1988

[30] Foreign Application Priority Data

Sep. 21, 1987 [JP] Japan .................................. 62-236487

[51] Int. Cl.⁴ ........................... G01S 1/16; G01S 1/18
[52] U.S. Cl. ...................................... 342/408; 342/372
[58] Field of Search ............... 342/412, 410, 413, 408, 342/372

[56] References Cited

U.S. PATENT DOCUMENTS 4,178,581 12/1979 Willey, Sr. ...................... 343/108 M Primary Examiner—Theodore M. Blum
Attorney, Agent, or Firm—Foley & Lardner, Schwartz, Jeffery, Schwaab, Mack, Blumenthal & Evans

[57] ABSTRACT

Guidance equipment for a microwave landing system has an azimuth guidance device and an elevation guidance device for providing angle information constructed into a single assembly. The selective formation of an azimuth scanning beam and an elevation scanning beam and the transmission of preamble signals are implemented by a single circuitry.

2 Claims, 4 Drawing Sheets

GUIDANCE EQUIPMENT FOR MICROWAVE LANDING SYSTEM

BACKGROUND OF THE INVENTION

The present invention generally relates to a microwave landing system and, more particularly, to azimuth guidance equipment and elevation guidance equipment which form a part of the ground installation of such a system and are constructed into a single assembly.

The ground installation of a microwave landing system includes azimuth guidance equipment and elevation guidance equipment which cooperate to provide angle information. It has been customary to construct the azimuth and elevation guides independently of each other and install each of them at a different location due to the process of development, the manner of operation and other various reasons particular thereto. However, it is not necessary that each of azimuth and elevation guidance information be transmitted from different locations, especially in a heliport. Both types of guidance equipment are essentially similar in construction to each other except for the arrangement of a radiating element array which constitutes a beam scanning antenna. Specifically, while the radiating element array of the azimuth guidance equipment is implemented as a waveguide slot array, that of the elevation guidance equipment is implemented as a printed board dipole array. The two different types of guidance equipment, therefore, can share a major part of the structural parts and elements with each other except for the radiating element array, and can be provided in a single assembly to constitute simple and inexpensive guidance equipment. Nevertheless, unitary azimuth and elevation guidance equipment has not been proposed in the past.

A prior art microwave landing system having a beam scanning antenna which is implemented as a phased array is provided with redundancy. However, a power amplifier, antenna switching unit and the like, which are included in both azimuth and elevation guidance equipment and constitute key elements of the system, are not provided with redundancy. When the system is constructed in a dual configuration, it is extremely difficult to provide the antenna switching unit with redundancy and therefore to enhance the reliability of operation.

SUMMARY OF THE INVENTION

It is therefore an object of the present invention to provide simple, inexpensive and reliable guidance equipment for a microwave landing system by constructing azimuth guidance equipment and elevation guidance equipment into a single assembly.

It is another object of the present invention to provide generally improved guidance equipment for a microwave landing system.

Guidance equipment for a microwave landing system of the present invention comprises an azimuth radiating element array for producing a scanning beam for an azimuth guidance equipment, elevation radiating element array for producing a scanning beam for elevation guidance equipment, an oscillation multiplier for generating a radio frequency signal, a control circuit for outputting a preamble signal and transmission timing signals which are individually assigned to the azimuth guide beam and the elevation guide beam, a modulator for modulating the radio frequency signal with the preamble signal and for transmitting the modulated radio frequency signal together with the radio frequency signal which is responsive to the transmission timing signals, a plurality of phase shift control units for controlling a level of the signal power to be applied to one radiating element of the azimuth radiating element array or one radiating element of the elevation radiating element array and to a drive phase of the radiating element in response to a control signal, a power divider for distributing signal power outputted by the modulator to a plurality of the phase shift control units, and a scanning control unit for delivering the control signal to each of a plurality of the phaes shift control units in response to the transmission timing signals and for controlling the phase shift control units such that at a transmission timing of the preamble signal a radiation pattern characteristic of the elevation radiating element array is changed.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
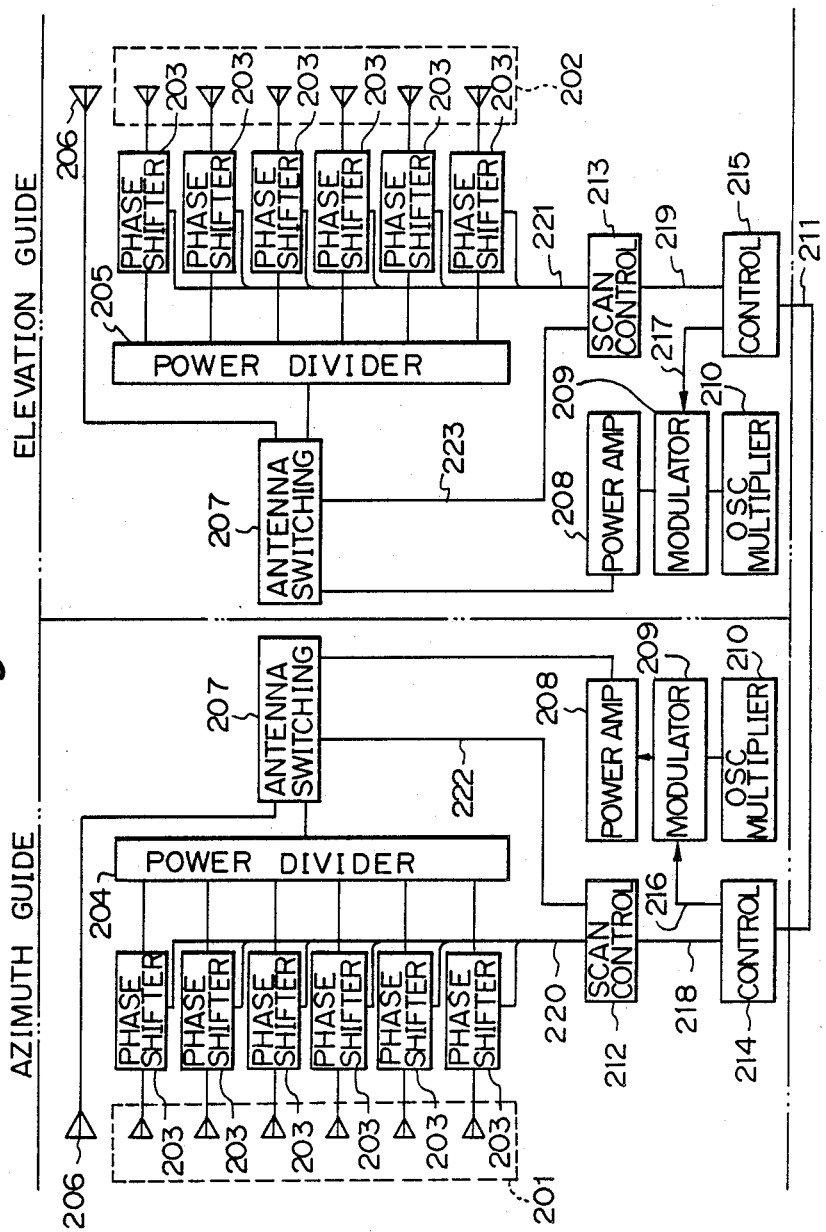
FIG. 1 is a schematic block diagram showing a ground installation of a prior art microwave landing system.

To better understand the present invention, a brief reference will be made to the ground installation of a prior art microwave landing system, shown in FIG. 1. As shown, the landing system is generally constituted by azimuth guidance equipment and elevation guidance equipment. The azimuth guidance equipment includes radiating elements 201 which are arranged in an array, phase shifters 203, a power divider 204, an auxiliary antenna 206, an antenna switching unit or antenna switchover 207, a power amplifier 208, a modulator 209, an oscillation multiplier 210, a scanning control unit 212, and a control circuit 214. Likewise, the elevation guidance equipment includes radiating elements 202 arranged in an array, phase shifters 203, a power divider 205, an auxiliary antenna 206, an antenna switching unit 207, a power amplifier 208, a modulator 209, an oscillation multiplier 210, a scanning control unit 213, and a control circuit 215.

The oscillation multiplier 210 generates a radio frequency signal whose frequency lies in the C band (5 gigahertz band) and feeds it to the modulator 209. Each of the control circuits 214 and 215 produces a preamble signal and a transmission timing signal. The preamble signal includes a reference signal for implementing the measurement of time on aircraft and a function identification signal. The preamble signal is applied in the form of a modulating signal 216 or 217 to the modulator 209 while the transmission timing signal is fed as a timing signal 218 or 219 to the scanning control unit 212 or 213. In response, the modulator 209 modulates the radio frequency signal with its associated modulating signal 216 or 217 by DPSK (Differential Phase Shift Keying) to produce a digital code signal. After the transmission of the modulating signal 216 or 217, the modulator 209 continues to apply the radio frequency signal to the power amplifier 208 until a predetermined period of time expires. The power amplifier 208 amplifies the output of the modulator 209 to a predetermined power level and feeds the amplified signal to a signal input terminal of the antenna switching unit 207.

The antenna switching unit 207 selectively feeds power to the auxiliary antenna 206 and a beam scanning antenna at adequate timings which are defined by a switching unit control signal 222 or 223. The beam scanning antenna is made up of the radiating element array 201 or 202, phase shifters 203 each being associated with a respective primary radiating element of the antenna array 201 or 202, and power divider 204 for distributing power to the phase shifters 203. A scanning control signal 220 or 221 is fed to the individual phase shifters 203. The scanning control unit 212 outputs the switching unit control signal 222 or 223 and the scanning control signal 220 or 221 on the basis of the timing signal 218 or 219 which is applied thereto from the control circuit 214 or 215. As a result, the beam scanning antenna of the azimuth guidance equipment and that of the elevation guidance equipment are switched with respect to time so as to perform beam scanning. Prior to the beam scanning, a preamble signal is emitted from the auxiliary antenna 206 which is associated with the beam scanning antenna.

Figure 2:
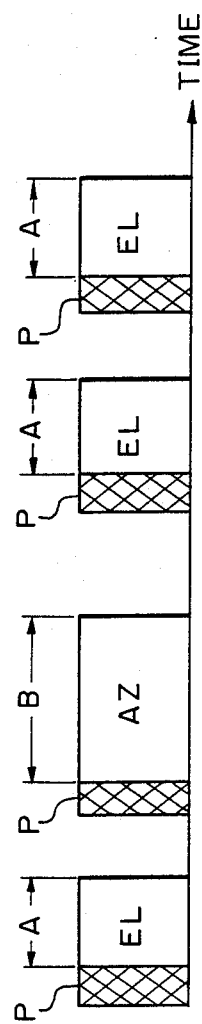
FIG. 2 is a timing chart showing transmission timings.

As shown in FIG. 2, assume an elevation scanning period A, an azimuth scanning period B, an elevation scanning period A and an elevation scanning period A which occur in this order by way of example. Then, a preamble signal P appears at the leading edge of each scanning period. The beam scanning antenna of the azimuth guide defines a vertically wide and horizontally narrow fan beam and moves in a reciprocating motion in the azimuthal direction. On the other hand, the beam scanning antenna of the elevation guide forms a horizontally wide and vertically narrow fan beam and reciprocatingly moves it in the elevational direction. The synchronization of the transmission timings of the azimuth and elevation guidance equipment is set up by a synchronizing signal 211 which is fed from the control circuit 214 to the control circuit 215.

It is clear from FIG. 1 that the azimuth guidance equipment and the elevation guidance equipment are essentially analogous in construction except for two points: the radiating element array 201 is implemented as a waveguide slot array while the radiating element array 202 is implemented as a printed board diplole array, and the modulating signals 216 and 217 and the timing signals 218 and 219 which are outputted by the control circuits 214 and 215, respectively, are different from each other. Nevertheless, the control circuits 214 and 215 can be implemented by almost the same construction, i.e., the two different types of guidance equipment can share a major part of the structural parts and elements with each other except for the radiating element arrays.

The present invention is successful in providing the azimuth guidance equipment and the elevation guidance equipment in a unitary configuration. A preferred embodiment of the present invention will be described hereinafter with reference to FIGS. 3 and 4.

Figure 3:
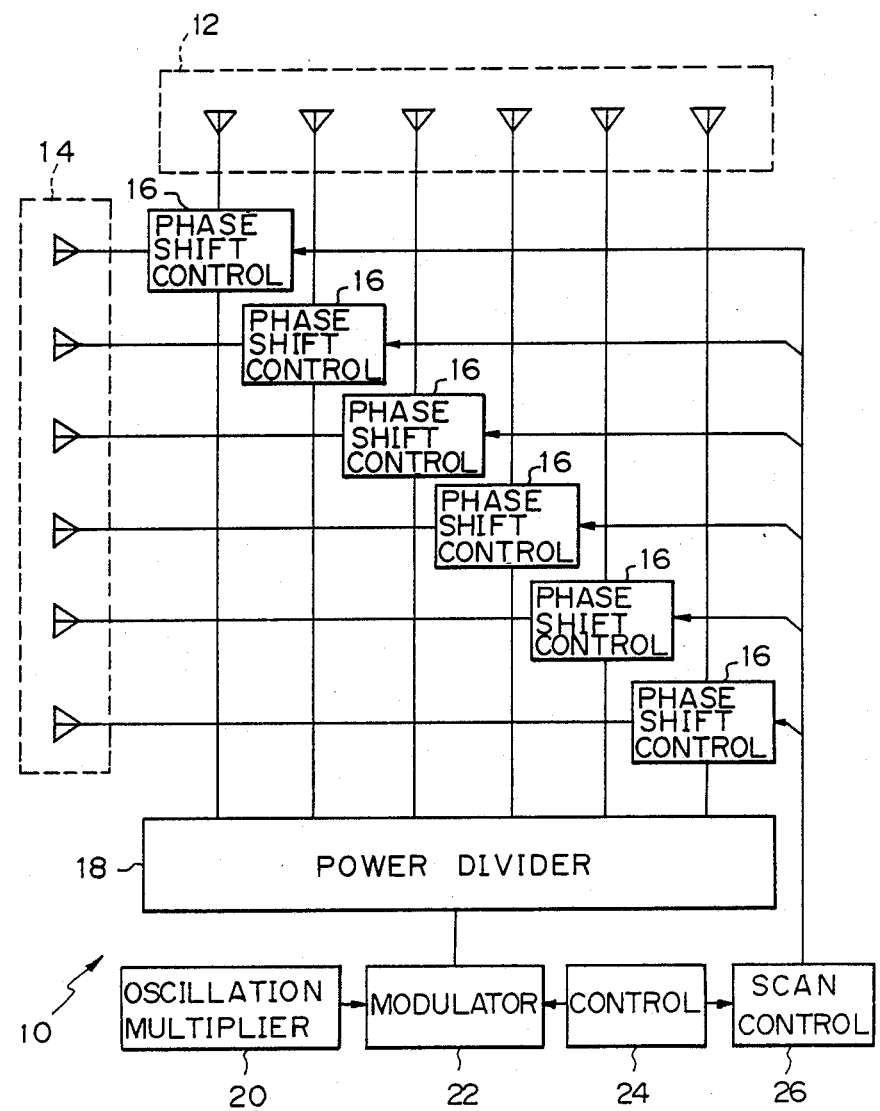
FIG. 3 is a schematic block diagram showing one embodiment of guidance equipment in accordance with the present invention.

Referring to FIG. 3, guidance equipment embodying the present invention is shown and is generally designated by the reference numeral 10. As shown, the guidance equipment 10 includes a radiating element array 12 adapted as elevation guidance equipment and a radiating element array 14 adapted as an azimuth guidance equipment. While the arrays 12 and 14 are shown as comprising the same number of radiating elements, this is only illustrative and for not essential. The equipment 10 further includes a plurality of phase control units 16. Usually, the number of phase control units 16 is equal to the number of the radiating elements of the radiating element array which has more radiating elements than the other. In the illustrative embodiment, since the two radiating element arrays are the same with respect to the number of elements, the phase control units 16 are each associated with one of the radiating elements of the array 12 and one of the radiating elements of the array 14. A specific construction of such a phase control unit 16 will be described later in detail with reference to FIG. 4. Also included in the equipment 10 are a power divider 18, an oscillation multiplier 20, a modulator 22, a control circuit 24, and a scanning control unit 26 which are essentially the same as those shown in FIG. 1 with respect to their functions.

In operation, the oscillation multiplier 20 generates a radio frequency signal which lies in the 5 gigahertz band and feeds it to the modulator 22. The control circuit 24 outputs a preamble signal as well as transmission timing signals which are individually assigned to an azimuth guide beam and an elevation guide beam. The preamble signal and transmission timing signals are delivered to the modulator 22 while, at the same time, the transmission timing signals are applied to the scanning control unit 26. The preamble signal may have a different content for the azimuth guidance equipment and for the elevation guidance equipment. The modulator 22 modulates the radio frequency signal with the preamble signal by the DPSK principle and feeds its output to the power divider 18 together with the radio frequency signal which is responsive to the transmission timing signals. In response, the power divider 18 distributes the output signal power of the modulator 22 to a plurality of phase control units 16. At the same time, the scanning control unit 26 responds to the preamble signal and transmission timing signals and delivers to the plurality of phase control units 16 a control signal which defines a vertical plane for the emission of a preamble and a scanning control signal.

Figure 4:
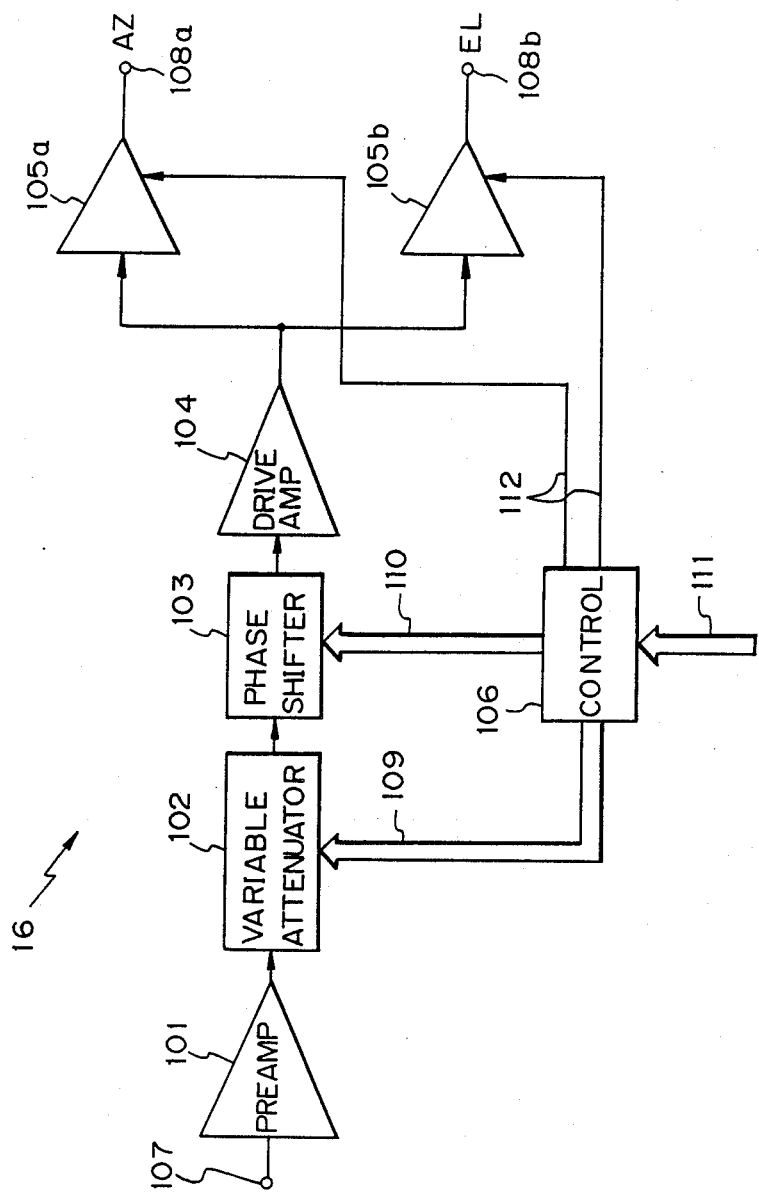
FIG. 4 is a block diagram schematically showing a specific construction of a phase control unit in accordance with the present invention.

As shown in FIG. 4, each of the phase control units 16 comprises a preamplifier 101, a variable attenuator 102, a phase shifter 103, a drive amplifier 104, an azimuth power amplifier 105a, an elevation power amplifier 105b, a control circuit 106, an input terminal 107, an azimuth output terminal 108a, and an elevation output terminal 108b. In response to a scanning control signal 111 from the scanning control unit 26, the control circuit 106 generates various kinds of predetermined control signals, i.e., control signals 109, 110 and an ON-OFF control signal 112. The control signals 109 and 110 are respectively fed to the variable attenuator 102 and the phase shifter 103 while the ON-OFF control signal 112 is routed to the azimuth power amplifier 105a and elevation power amplifier 105b, whereby those structural parts are each controlled to a predetermined condition. The output signal of the power divider 18 is applied via the input terminal 107 to the preamplifier 101 to be amplified and then routed to the variable attenuator 102 to be attenuated by a necessary amount. The output of the variable attenuator 102 is fed to the phase shifter 103 to be shifted in phase by a necessary amount and then amplified by the drive amplifier 104. The output of the drive amplifier 104 is distributed to the azimuth and elevation power amplifiers 105a and 105b.

The azimuth and elevation power amplifiers 105a and 105b, respectively, are each controlled to an operative state and an inoperative state by the ON-OFF signal 112. Specifically, the azimuth power amplifier 105a is rendered operative at a beam scanning timing for azimuth guidance with the elevation power amplifier 105b remaining inoperative. In this condition, the output of the power amplifier 105a is routed through the azimuth output terminal 18a to an associated radiating element of the array 14 so as to drive them in a predetermined phase and amplitude. Conversely, at a beam scanning timing for elevation guidance, the elevation power amplifier 105b becomes operative to feed its output to associated radiating elements of the array 12 via the elevation output terminal 18b, thereby driving them in a predetermined phase and amplitude. At each of the beam scanning timings for azimuth guidance and elevation guidance, the signal amplitude applied to the radiating element array is controlled by the variable attenuator 102 to have a Tailor distribution, and the amount of phase shift is controlled by the phase shifter 103 in matching relation to the beam angle. In this construction, the radiating element arrays 12 and 14 can individually define fan beams for elevation guidance and azimuth guidance which are comparable with those of the prior art.

When a preamble signal for azimuth guidance and elevation guidance is to be transmitted, the amplitude and phase of a signal to be fed to the radiating elements of the elevation guide array 12 are controlled so as to form a radiation pattern while, at the same time, the signal applied to those radiating elements which are located at opposite end portions of the array 12 is interrupted. As a result, the aperture length may be changed to define a radiation pattern which is almost identical with a radiation pattern particular to the conventional auxiliary antenna. In this manner, the illustrative embodiment eliminates the need for the auxiliary antenna and uses the radiating element array 12 for two different purposes, i.e., for forming a beam for elevation guidance and for transmitting a preamble signal. It is to be noted that the azimuth power amplifier 105a is rendered inoperative when a preamble signal is transmitted.

As described above, the illustrative embodiment is as successful as the prior art in effecting the transmission of preamble signals and beam scanning at the exemplary timings shown in FIG. 2.

In the illustrative embodiment, a power amplifier is not provided at an input stage of a power divider instead the phase shifters 16 variably amplify power to a suitable level individually. Hence, the need for an expensive high power transistor is eliminated. Moreover, regarding the power amplifier and antenna switching unit heretofore used, equivalent redundancy is achievable so that a highly reliable system is implemented without resorting to an expensive dual arrangement.

In summary, the present invention provides guidance equipment for a microwave landing system in which a single circuit suffices for both the selective formation of an azimuth scanning beam and an elevation scanning beam and the transmission of preamble signals. More specifically, the present invention provides simple, inexpensive, small size, light weight and reliable guidance equipment by constructing azimuth guidance equipment and elevation guidance equipment into a single assembly.

Various modifications will become possible for those skilled in the art after receiving the teachings of the present disclosure without departing from the scope thereof.

What is claimed is:

1. Guidance equipment for a microwave landing system, comprising:
   an azimuth radiating element array producing a first scanning beam for azimuth guidance, said azimuth radiating element array including a plurality of azimuth radiating elements;
   an elevation radiating element array producing a second scanning beam for elevation guidance, said elevation radiating element array including a plurality of elevation radiating elements;
   oscillation multiplier means for generating a radio frequency signal;
   a control circuit outputting a preamble signal and transmission timing signals which are individually assigned to said first scanning beam and said second scanning beam;
   modulator means for modulating said radio frequency signal with said preamble signal and for transmitting a modulated radio frequency signal together with said radio frequency signal responsive to said transmission timing signals;
   a plurality of phase shift control means for distributing a plurality of signal power signals which are fed to said plurality of phase shift control means, each of said phase shift control means individually responding to a control signal for controlling a level of signal power and a drive phase applied to one azimuth radiating element of said azimuth radiating element array during a first time period and to one elevation radiating element of said elevation radiating element array during a first time period;
   power divider means for distributing signal power outputted by said modulator means to said plurality of phase shift control means; and
   scanning control means for delivering said control signal to each of said plurality of phase shift control means in response to said transmission timing signals and for controlling said plurality of phase shift control means such that at a transmission timing of said preamble signal a radiation pattern characteristic of said elevation radiating element array is changed.

2. Guidance equipment as claimed in claim 1, wherein when azimuth radiating elements of said azimuth radiating element array and elevation radiating elements of said elevation radiating element array are different in number, said phase shift control means are equal in number to the number of azimuth radiating elements of said azimuth radiating element array or the number of elevation radiating elements of said elevation radiating element array, whichever array has a greater number of radiating elements.

* * * * *